March 6, 1934.     A. J. ELLISON     1,949,995
HELICOPTER OR WINGLESS AIR VEHICLE
Filed March 25, 1932     2 Sheets-Sheet 1

INVENTOR
August J. Ellison
BY
Swan, Frye, + Hardesty
ATTORNEY

March 6, 1934.  A. J. ELLISON  1,949,995
HELICOPTER OR WINGLESS AIR VEHICLE
Filed March 25, 1932   2 Sheets-Sheet 2

INVENTOR
August J. Ellison
BY Swan, Frye, & Hardesty
ATTORNEY

Patented Mar. 6, 1934

1,949,995

UNITED STATES PATENT OFFICE 1,949,995

HELICOPTER OR WINGLESS AIR VEHICLE

August J. Ellison, Detroit, Mich.

Application March 25, 1932, Serial No. 601,089

2 Claims. (Cl. 244—19)

This invention relates to air vehicles and more particularly to wingless air vehicles of "ships".

An object of the invention is a ship having, instead of a wing of the conventional form, a series of freely rotatable horizontal propellers mounted on vertical axles in a skeleton framework, extending across the cabin—like the wing used in a conventional winged plane.

A ship of the present design can take off and land vertically; is not subject to nose dives and tail spins; offers less wind resistance than conventional planes; and in many other respects, is an improvement over planes of the conventional design.

In the novel ship, the balanced flying wing, which is not truly a wing but because of its location may be referred to as a wing, has for its spread four or more horizontal propellers. In the simplest embodiment of the invention, two large propellers are used, one on either side of the cabin, and two smaller propellers are placed at the tips of the framework, the smaller propellers being placed slightly above the level of the larger ones.

The propellers are normally freely rotatable on stationary axles, but are preferably provided with clutch connections to the main engine drive, by means of which the propellers may be rotated by the engine for a vertical take off, when the pilot has reached the desired height, approximately 1000 feet, he will release the clutch. The propellers will then reverse themselves and be self rotating from the wind resistance from forward flight. Further, the propellers will be provided with brakes whereby they may be held stationary to serve as parachutes, while the plane is landing. In any event, when the plane is in ordinary flight, the propellers rotate freely in a direction opposite to the direction of rotation in the take off and offer no wind resistance.

The smaller propellers placed at the wing tips and above the level of the large propellers act as stabilizers while the ship is in motion and thus insure a perfect balance to the ship. In a ship so balanced, the empenage or tail is eliminated and this represents a considerable improvement over ships of the prior art.

In the preferred embodiment the ship parts such as cabin, engine, driving or pushing propellers, vertical fins, etc. are so located with respect to the horizontal wing structure as to have a low center of gravity, this resulting in insuring a perfect balance to the plane, on all axes.

If desired, the invention may be incorporated in a conventional winged plane with attendant advantages, one of them being the elimination of a balancing tail for the plane.

The plane is or may be equipped with a sleeve around the driving propeller to decrease air slippage therethru, and thus to increase the efficiency thereof. The sleeve will also serve to reduce objectionable propeller noises and will provide a safety guard.

The invention may also be embodied in a glider which will then have the advantages similar to those outlined above.

It will be noted that when, due to the increased size of the plane, more propellers are desired, two or more wings, each equipped with horizontal propellers may be used. In such cases two additional horizontal propellers serving as stabilizers may be mounted on the front and rear end of the plane cabin, these being at a higher elevation than the wing propellers.

Another invention is a means for preventing the formation of ice on the propellers by conducting hot exhaust gases from the engine thru the propeller's axles and into hollow chambers in the propeller blades from where the cooled gases are vented to the atmosphere.

It will, of course, be understood that this feature of the invention may be incorporated in conventional planes thru pipes leading into the wings and is not necessarily limited to the form shown.

Still further objects will readily occur to those skilled in the art upon reference to the following description and the accompanying drawings, in which Fig. 1 is a front elevation view of a wingless ship or plane embodying the present invention.

Figure 1:
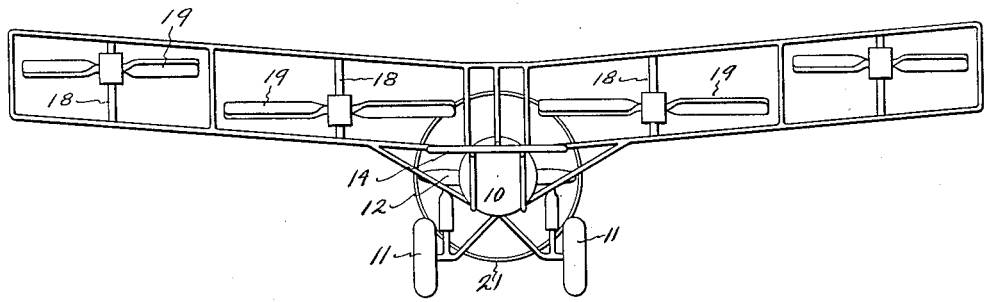
Figure 2:
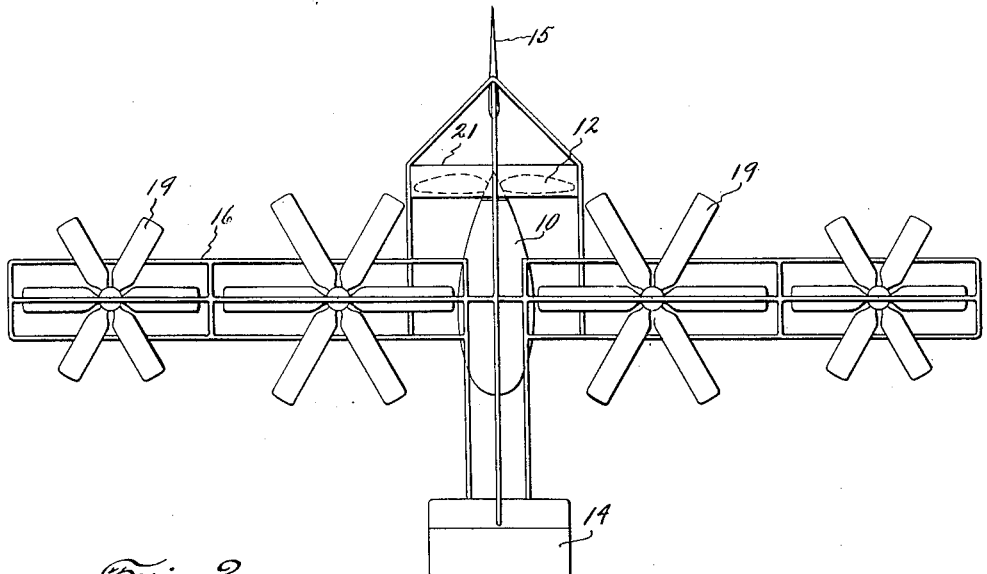
Fig. 2 is a top plan view of the same.

While many different embodiments of the invention might well be illustrated, it is preferred to select the simplest embodiment as illustrative of the principles underlying the invention and for this reason, in Figs. 1 and 2, there is shown a simple ship having a bullet shaped cabin 10, supported in a more or less conventional manner on wheels 11, and having a pusher type propeller 12 in the rear, in proximity to the rudder 15, the elevators being mounted in front at 14. Above, and projecting transversely across the cabin is a framework 16, located in substantially the same position as the wing on a conventional plane. The framework is provided with vertical axles 18 upon which are journalled the horizontal propellers 19, these being shown more or less sketchily because the invention is concerned, not so much with the form and shape of the parts as, with the principles underlying the arrangement shown.

In the simplest embodiment shown, four propellers are provided, two small ones being located on what might be called the wing tips and two larger ones slightly below the small ones, the large ones being located between the small propellers and the cabin, substantially as shown.

Figure 3:
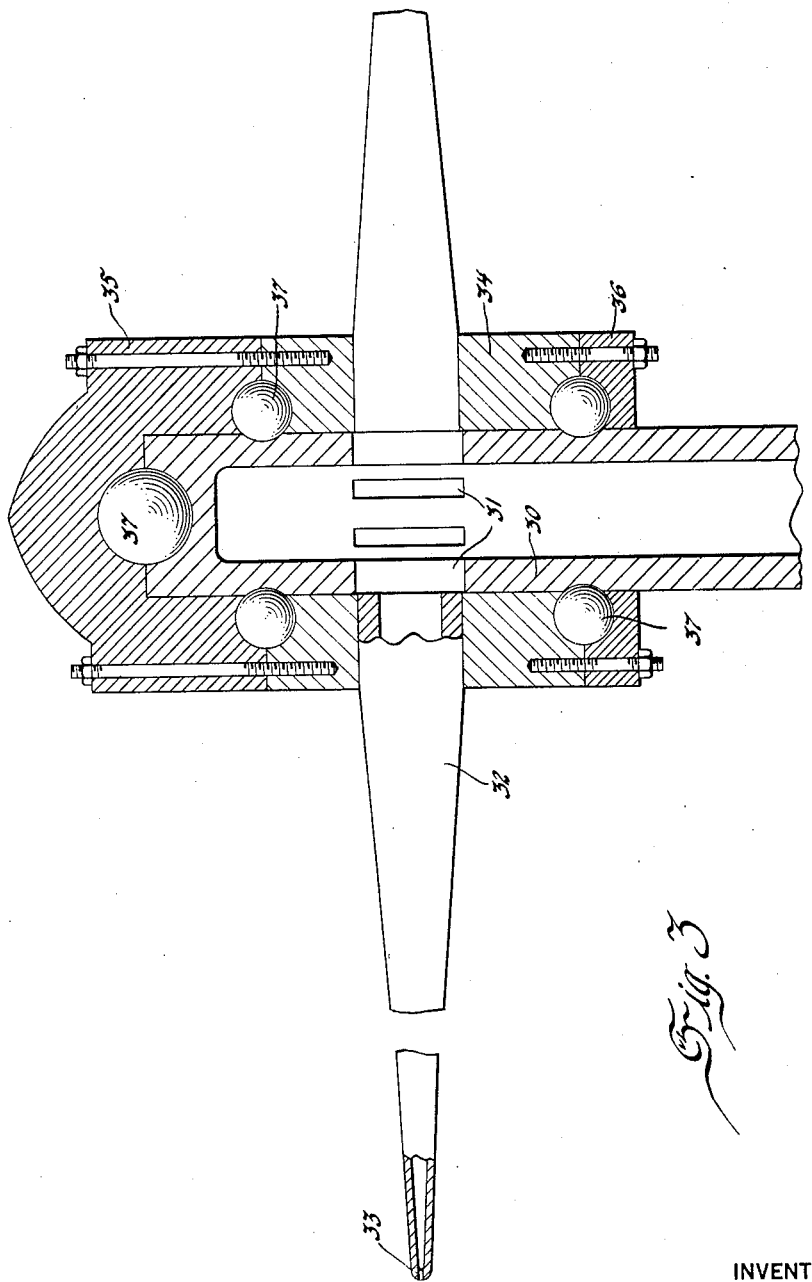
Fig. 3 is a section view showing means for preventing the formation of ice on a propeller.

In Fig. 3 is disclosed means for preventing the formation of ice on the propellers and such means includes a stationary tubular axle 30 having ports 31 communicating with the hollow interior of the propeller blades 32, the latter having, at its ends, vents 33 by means of which hot exhaust gases conducted into the propeller thru the ports 31 may escape to the atmosphere.

The propeller is provided with a hub 34 to which on opposite sides, are secured a cap 35 and a plate 36. Suitable ball bearings 37 are provided to form frictionless journals or bearings for the propeller on a stationary axle.

It is preferred to provide a guard ring or sleeve 21 around the driving propeller as indicated above for the purpose of increasing the efficiency and decreasing noise as well as serving to guard against accident.

As additional controls, conventional ailerons may be mounted upon the outer portions of the wing structure in the usual manner.

Now having described the invention and the preferred embodiment thereof, it is to be understood that the said invention is to be limited, not to the specific details herein set forth, but only by the scope of the claims which follow:

What I claim is:

1. A supporting structure for an air vehicle comprising a series of freely rotatable horizontal propellers disposed in a generally wing-like arrangement, the propellers nearer the ends of the structure being smaller and arranged higher than those nearer the center of the structure.

2. In an air vehicle a series of freely rotatable horizontal propellers arranged in a wing-like structure, the area of rotation of the propellers being substantially equal to the area of spread of the wing-like structure, the propellers on the ends of the structure being smaller than and arranged above those nearer the center of the structure.

AUGUST J. ELLISON.